3,310,278
CIRCULAR VALVING MEMBER
Russell G. Smith, Cincinnati, Ohio, assignor to Continental Manufacturing Company, Cincinnati, Ohio, a corporation of Ohio
Filed Nov. 5, 1964, Ser. No. 409,169
5 Claims. (Cl. 251—317)

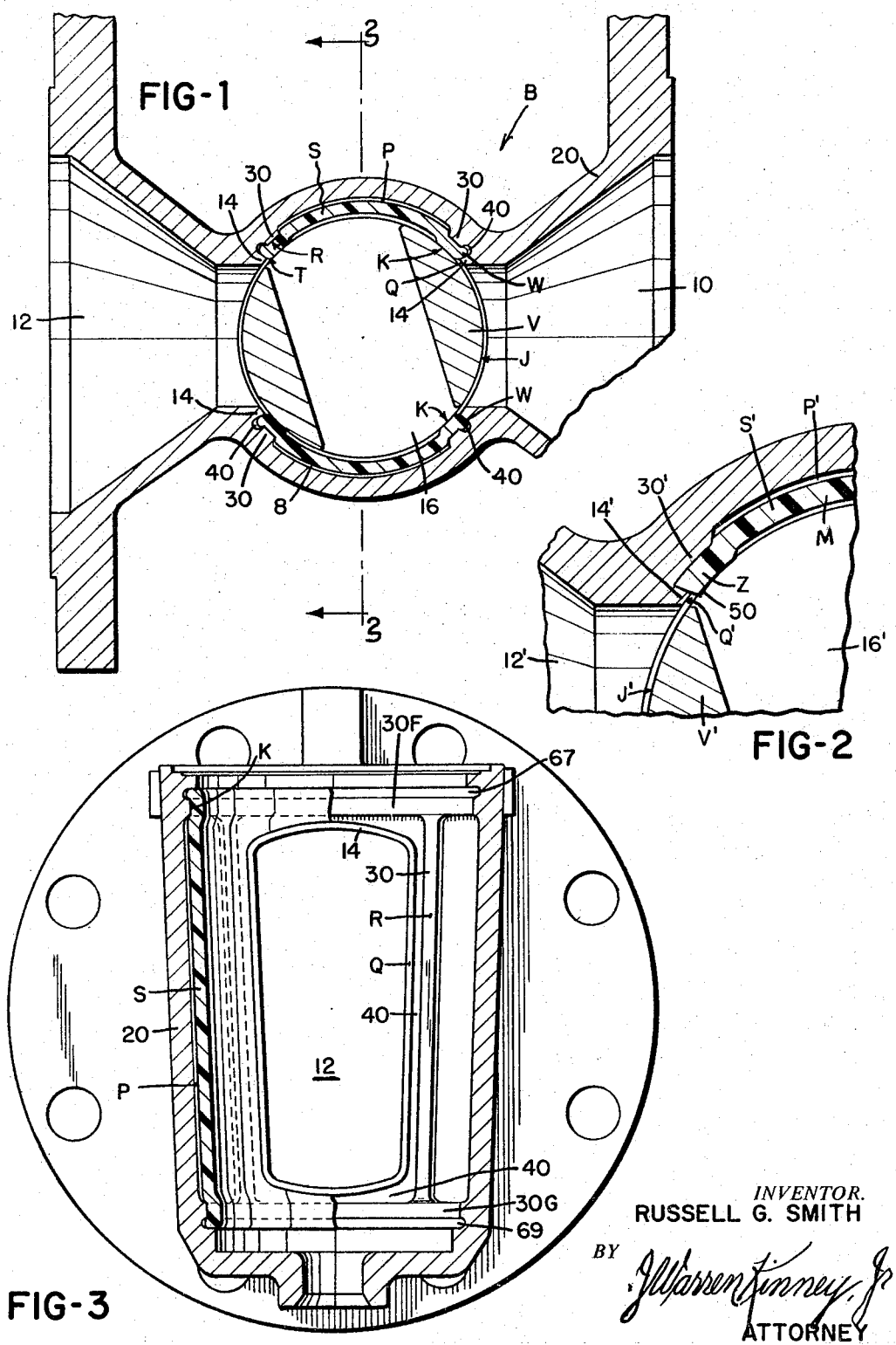

This invention relates to lined plug valves having substantially rectangular flow passages and more particularly to valves in which the liner or sealing member is formed of a deformable material having a low coefficient of friction and which is substantially resistant to corrosives and solvents.

An object of the invention is to provide continuous relief areas which completely surround and are disposed between continuous flow-passage-defining lips and continuous high pressure sealing ribs provided in the body bore.

Another object of the invention is to provide means in and adjacent the substantially rectangular flow passages of a lined valve for accommodating the peripheral port-adjacent ends of a sleeve member in such a manner as to utilize the compressive stresses induced in the sleeve member while it is being sized in the body bore over the high pressure sealing ribs to normally urge and maintain said peripheral edges in said means and out of interfering relationship with the valving member.

Still another object of the invention is to provide means for accommodating the expansion which occurs in a deformable sealing material having a low coefficient of friction and which is substantially resistant to corrosives and solvents such as, by way of example, Teflon, when subjected to heat such as encountered in the normal application and use of high pressure and high temperature lined plug valves.

A further object of the invention is to provide a valve construction having the hereinabove described characteristics wherein the relief areas which completely surround the outwardly projecting port-defining lips are such that the presence of compressive stresses in the sleeve member over the high pressure sealing ribs of the valve will bend or force the peripheral edge of the sleeve member away from the valving member and into said relief areas.

These and other objects are attained by the means described herein and disclosed in the accompanying drawings in which:

FIG. 1 is a horizontal sectional view taken through a lined plug valve embodying the teachings of the present invention.

FIG. 2 is a fragmental view of the fourth quadrant of a lined plug valve construction illustrating the conditions which the valve of the present invention overcomes.

FIG. 3 is a view taken on line 3—3 of FIG. 1.

With particular reference to FIG. 1 the letter B denotes generally a plug valve having a plug-receptive-bore 8; substantially rectangular flow passages 10 and 12, the bore-adjacent ends of each of which terminate in continuous, circumferential lips 14; and a valving member V having a substantially rectangular flow passageway 16 therethrough rotatably mounted within the bore of the valve body 20.

The numeral 30 denotes continuous high pressure sealing ribs which are spaced from and which completely surround lips 14. It will be noted that ribs 30 also completely encircle the bore at 30F and 30G, FIG. 3 in axially spaced relation, that is, beyond the upper and lower ends of the flow passages in the body member as said passages are defined by lips 14.

The peripheral surfaces Q of lips 14 and the peripheral surfaces R of ribs 30 constitute inwardly facing transversely curved surfaces of substantial width and paralleling the opposing curved surface J of the valving member V.

As clearly illustrated in FIG. 1, the extent of the inward projection of lips 14 exceeds that of ribs 30, it being noted that the projection of ribs 30 is substantially less than one-half of the extent of the projection of lips 14.

Uniformly, satisfactory results have been obtained in those instances wherein the clearance between surfaces Q of lips 14 and surface J of the valving member V approximates .030 inch, and wherein the extent of projection of ribs 30 is such as to provide an interference fit of approximately .030 inch with the sleeve member S when the sleeve is compressed into place by means of a sizing die, not illustrated.

A continuous recessed area 40 completely surrounds each of lips 14, said recessed area being disposed between and defining the adjacent edges of lips 14 and ribs 30.

Those portions of the bore between adjacent side edges of the ribs 30 which surround flow passageways 10 and 12 are provided with recessed areas P of a depth approximating the depth of recessed areas 40.

With particular reference now to FIG. 1, it will be noted that the bore is provided with continuous raised lips 14 which completely surround and define the bore-adjacent-ends of flow passages 10 and 12 in the body, and with other continuous raised areas in the form of ribs 30 which completely surround lips 14, said bore further being provided with a continuous circumferential recessed area between said raised areas as defined by lips 14 and ribs 30 and with other recessed areas P adjacent the raised areas defined by ribs 30.

The letter S denotes a liner or sealing member formed of a deformable material having a low coefficient of friction and which is substantially resistant to corrosives and solvents such as, by way of example, Teflon.

Sealing member S is adapted to be received within the body bore, it being understood that the sealing member is initially provided with substantially rectangular openings which are dimensioned to conform with those peripheral edges of lips 14 adjacent recesses 40. After the sealing member has been fully inserted into the body bore with lips 14 projecting into and substantially through the lip-receptive openings of the sleeve, a sizing plug of a dimension corresponding to that of valving member V, but having no flow passages therein, is advanced axially, into the interior of the sealing member for thereby imparting and exerting an outward, radial, compressive force to said member sufficient to increase the internal diameter of the sealing member for compressing it radially beyond its elastic limits over the raised areas defined by ribs 30 in the bore while simultaneously forcing other portions of the sealing member to partially fill at least a portion of the recessed areas P and 40 of the bore for locking the sealing member therein.

The net result of the aforesaid sizing operation is to compress and thereby improve the sealing characteristics of the sealing member in certain well defined areas by providing high pressure sealing areas therein overlying ribs 30, 30G and 30F, and of providing low pressure sealing areas in all other areas of the sealing member.

While a sizing die is being advanced axially into the sealing member the plug-adjacent side thereof will be subjected to higher stresses than the bore-adjacent surfaces of the sealing member with the result that the peripheral edges W of the sealing member will flex or bend toward the zone of less stress, viz. into recess 40 and incident thereto a rounded corner or edge T will be provided in said member.

The advantages of my valve construction may be readily appreciated from a comparison of the relationship of the valving member, V; sealing member S and body ports 12 of the fourth quadrant of FIG. 1 with FIG. 2.

In FIG. 2 I have illustrated a sealing member S' having portions M received within recessed area P'; a high pressure sealing area Z over rib 30'; and a peripheral lip 14' projecting toward and terminating in inwardly facing transversely curved surface Q' having a substantial width and paralleling the opposing curved surface J' of the valving member V'.

If it now be assumed that the sealing member of FIG. 2 was subjected to the compressive action of a sizing plug—as heretofore explained with reference to the construction illustrated in FIG. 1—portions 50 of the sealing member S' adjacent lips 14' will project away and fan outwardly from those portions Z remote from lips 14' by reason of the inherent resilience of the sealing member material with the result that portions 50 of sealing member S' will, as illustrated in FIG. 2, extend or project outwardly into flow passageway 16' of the valving member V' in which event the said protruding portion will not only impair the ease-of-operation of the valving member, but it will also result in said projecting portion being literally torn away by the valving member as it is turned throughout its operating positions. My valve structure solves the problem illustrated in FIG. 2 which has long confronted the industry.

In FIG. 3, the numerals 67 and 69 denote other circumferentially extending recessed areas which completely encircle the body bore in axially spaced relation with rib portions 30F and 30G.

From the foregoing, it will be noted that I have thus provided a lined plug valve having substantially rectangular flow passages and wherein any and all throttling which occurs incident to opening and closing of the valve is confined to the adjacent metallic surfaces of the plug-port passageway 16 and lips 14. It will be further noted that the provision of lip 14 and the relationship therewith of the peripheral edges W of sleeve S will effectively and positively preclude pressure differential occurring on opposite sides of the sealing member tending to dislodge the sealing member from the body bore during rotational movement of the valving member in opening and closing of the valve.

The provision of the continuous recessed area 40 which completely surrounds lips 14 and which separates lips 14 from their respective concentric ribs 30 provides a low pressure sealing area in the sealing member of such a nature as to result in the peripheral edges W of the sealing member being received in said recessed areas in such a manner that a rounded portion T will be provided—said rounded portion preventing the sealing member from being dislodged incident and/or during rotational movement of the valving member in opening and closing the valve.

The construction of my valve also permits its use as an efficient bi-directional valve under all operating conditions.

It should be understood that various changes and modifications may be made in the structural details of the device within the scope of the appended claims without departing from the spirit of the invention.

What is claimed is:

1. A valve structure comprising a body-member a circular valving-member and a sealing member, said sealing member formed of a deformable material having a low coefficient of friction and which is substantially resistant to corrosives and solvents, the boby-member including a sleeve-and-valving-member receptive bore, each of said body and valving members having substantially rectangular flow passages, means mounting said valving member for movement relative to the said body member to place the flow passages of said valving member in and out of communication with the flow passages of said body member, the rectangular flow passages of said body member including continuous lips completely surrounding flow passages, the bore of said body including continuous ribs surrounding said continuous lips, said lips and ribs projecting toward and terminating in inwardly facing transversely curved surfaces having substantial width and paralleling the opposing curved surfaces of the valving member with the extent of the inward projection of the lips exceeding that of the ribs, continuous recessed areas surrounding said continuous lips, said recessed areas disposed between and defining the adjacent edges of said lips and ribs, said sealing member received in said body bore with portions thereof overlying said ribs, said sealing member having substantially rectangular passageways therethrough surrounding said lips, the said curved surface of the valving member being in fluid tight sealing engagement with the sealing member at those locations of said ribs which completely surround the flow passages of the body member, said sealing member having a thickness greater than the extent of the inward projection of the lips for precluding contact between the valving member and the said inwardly facing surfaces of the lips, the free peripheral edges of the sealing member adjacent said lips being received in the said recessed areas surrounding said lips for precluding contact between the valving member and the peripheral edges of said sealing member during rotational movement of the valving member in the opening and closing of the valve.

2. A valve structure comprising a body-member, a circular valving-member and a sealing member, said sealing member formed of a deformable material having a low coefficient of friction and which is substantially resistant to corrosives and solvents, the boby-member including a sleeve-and-valving-member receptive bore, each of said body and valving members having substantially rectangular flow passages, means mounting said valving member for movement relative to the said body member to place the flow passages of said valving member in and out of communication with the flow passages of said body member, the rectangular flow passages of said body member including continuous lips completely surrounding said flow passages, the bore of said body including continuous ribs surrounding said continuous lips and completely encircling said bore in axially spaced relation with the flow passages thereof, said lips and ribs projecting toward and terminating in inwardly facing transversely curved surfaces having substantial width and paralleling the opposing curved surface of the valving member with the extent of the inward projection of the lips exceeding that of the ribs, continuous recessed areas surrounding said continuous lips, said recessed areas disposed between and defining the adjacent edges of said lips and ribs, said sealing member received in said body bore with portions thereof overlying said ribs, said sealing member having substantially rectangular passageways therethrough surrounding said continuous lips, the said curved surface of the valving member being constantly in fluid tight sealing engagement with the sealing member at those locations of said ribs which completely encircle the bore, said sealing member having a thickness greater than the extent of the inward projection of the lips for precluding contact between the valving member and the said inwardly facing surfaces of the lips, the free peripheral edges of the sealing member adjacent said lips being received in the said recessed areas surrounding said lips for precluding contact between the valving member and the peripheral edges of said sealing member during rotational movement of the valving member in the opening and closing of the valve.

3. A valve structure as described in claim 2 which includes continuous recessed areas completely encircling said bore in axially spaced relation with the continuous encircling lips, and wherein the opposite ends of the sealing member is received in and partially fills at least a portion of said last mentioned recessed areas.

4. A valve structure comprising a body-member, a circular valving-member and a sealing member, said sealing member formed of a deformable material having a low coefficient of friction and which is substantially resistant to corrosives and solvents, the boby-member including a sleeve-and-valving-member receptive bore, each of said body and valving members having substantially rectangular flow passages, means mounting said valving member for movement relative to the said body member to place the flow passages of said valving member in and out of communication with the flow passages of said body member, the rectangular flow passages of said body member including continuous lips completely surrounding said flow passages, the bore of said body including continuous ribs surrounding said continuous lips and completely encircling said bore in axially spaced relation with the flow passages thereof, said lips projecting toward and terminating in inwardly facing transversely curved surfaces having substantial width and paralleling the opposing curved surface of the valving member with the extent of the inward projection of the lips providing a clearance with corresponding portions of the valving member, said ribs projecting toward and terminating in inwardly facing transversely curved surfaces having substantial width and paralleling the opposing curved surface of the valving member with the extent of projection of the inward projection of said ribs providing an interference fit with the sealing member, continuous recessed areas surrounding said continuous lips, said recessed areas disposed between and defining the adjacent edges of said lips and ribs, said sealing member received in said body bore with portions thereof overlying said ribs, said sealing member having substantially rectangular passageways therethrough surrounding said continuous lips, the said curved surface of the valving member being in fluid tight sealing engagement with the sealing member at the locations of said ribs, said sealing member having a thickness greater than the extent of the inward projection of the lips for precluding contact between the valving member and the said inwardly facing surfaces of lips, the free peripheral edges of the sealing member adjacent said lips being received in said recessed areas surrounding said lips for precluding contact between the valving member and the peripheral edges of said sealing member during rotational movement of the valving member in the opening and closing of the valve.

5. A valve structure as called for in claim 4 wherein the clearance between the surfaces of the valving member and inwardly facing surfaces of the lips approximates .030 inch, and wherein the interference fit between said ribs and sealing member is at least .030 inch.

References Cited by the Examiner

UNITED STATES PATENTS

| | | | |
|---|---|---|---|
| 2,987,295 | 6/1961 | Schenck et al. | 251—317 X |
| 3,199,835 | 8/1965 | Freed | 251—317 X |
| 3,206,163 | 9/1965 | Freed | 251—317 X |
| 3,263,697 | 8/1966 | Reed et al. | 251—317 X |

M. CARY NELSON, *Primary Examiner.*

E. K. FEIN, *Assistant Examiner.*